(12) United States Patent
Zhang

(10) Patent No.: US 9,738,546 B2
(45) Date of Patent: Aug. 22, 2017

(54) COMBINED DEVICE FOR SEWAGE DEEP TREATMENT AND TREATMENT METHOD

(71) Applicant: MISSISSIPPI INTERNATIONAL WATER (CHINA) INC., Hangzhou, Zhejiang (CN)

(72) Inventor: Dawei Zhang, Liaoning (CN)

(73) Assignee: MISSISSIPPI INTERNATIONAL WATER (CHINA) INC., Hangzhou, Zhejiang (CN)

( * ) Notice: Subject to any disclaimer, the term of this patent is extended or adjusted under 35 U.S.C. 154(b) by 201 days.

(21) Appl. No.: 14/777,967

(22) PCT Filed: Jan. 22, 2014

(86) PCT No.: PCT/CN2014/071106
§ 371 (c)(1),
(2) Date: Sep. 17, 2015

(87) PCT Pub. No.: WO2014/146513
PCT Pub. Date: Sep. 25, 2014

(65) Prior Publication Data
US 2016/0272508 A1    Sep. 22, 2016

(30) Foreign Application Priority Data

Mar. 18, 2013  (CN) .......................... 2013 1 0084992

(51) Int. Cl.
*C02F 1/28*  (2006.01)
*B01D 24/00*  (2006.01)
(Continued)

(52) U.S. Cl.
CPC .............. *C02F 1/281* (2013.01); *B01D 15/14* (2013.01); *B01D 15/22* (2013.01); *B01D 24/005* (2013.01);
(Continued)

(58) Field of Classification Search
CPC .......... C02F 1/004; C02F 1/006; C02F 1/283; C02F 2201/002; C02F 2201/005;
(Continued)

(56) References Cited

U.S. PATENT DOCUMENTS 3,436,343 A * 4/1969 Smith ..................... C02F 1/283
210/189
4,085,043 A * 4/1978 Ellis ........................ C02F 1/283
210/189

FOREIGN PATENT DOCUMENTS

CN       1083642 A    7/2006
CN     101805088 A    8/2010
(Continued)

OTHER PUBLICATIONS

International Search Report for corresponding International Patent Application No. PCT/CN2014/071106 mailed Apr. 28, 2014.

*Primary Examiner* — Matthew O Savage
(74) *Attorney, Agent, or Firm* — Merchant & Gould P.C.

(57) ABSTRACT

A combined device for sewage deep treatment integrally consists of an open box body (1) divided into multiple water treatment units (29) by a partition wall (27). Each water treatment unit (29) is divided into multiple grids by a partition wall (27'). The lower part of the box body (1) is provided with a conical structure (30) having a discharging door (22) thereunder. The partition wall (27) of the box body (1) has a water blocking belt (33) in the middle thereof, and the box body (1) has rails (31) mounted on two sides of the top thereof, rails (31) having an electric operating platform (2) mounted thereon. The box body (1) is filled with water processing granular carbon (32). Also disclosed is a sewage treatment method employing the combined sewage deep-treatment device. With the method, it is convenient to replace activated carbon, thereby solving the problem that it is difficult for the sewage treatment system to operate (Continued)

continuously and stably when replacing the activated carbon in traditional activated carbon filter.

8 Claims, 5 Drawing Sheets

(51) Int. Cl.
*B01D 15/14* (2006.01)
*B01D 15/22* (2006.01)
B01D 24/26 (2006.01)
C02F 1/00 (2006.01)
B01D 24/44 (2006.01)

(52) U.S. Cl.
CPC .............. *C02F 1/006* (2013.01); *C02F 1/283* (2013.01); *B01D 24/266* (2013.01); *B01D 24/44* (2013.01); *C02F 1/004* (2013.01); *C02F 2201/002* (2013.01); *C02F 2201/005* (2013.01); *C02F 2209/003* (2013.01)

(58) Field of Classification Search
CPC . C02F 2209/003; B01D 24/005; B01D 24/26; B01D 24/266; B01D 24/44
USPC .................................................. 210/264, 268
See application file for complete search history.

(56) References Cited

FOREIGN PATENT DOCUMENTS

| CN | 103172220 A | 6/2013 |
|---|---|---|
| CN | 203173899 U | 9/2013 |
| EP | 0 845 286 A2 | 6/1998 |
| EP | 201206541 A | 2/2012 |

* cited by examiner

COMBINED DEVICE FOR SEWAGE DEEP TREATMENT AND TREATMENT METHOD

This application is a National Stage Application of PCT/CN2014/071106, filed 22 Jan. 2014, which claims benefit of Serial No. 201310084992.6, filed 18 Mar. 2013 in China and which applications are incorporated herein by reference. A claim of priority is made to each of the above disclosed applications.

FIELD

The present disclosure relates to a technical field of sewage treatment, in particular, to a device for sewage deep treatment and a sewage treatment method by using the same.

DESCRIPTION OF THE RELATED ART

Since water environment pollution in China becomes more and more serious, the sewage standards for pollutants discharge increases significantly. The sewage, after being treated by traditional methods such as biological, chemical, oxidation treatment, must be subjected to a deep treatment in order to achieve the new discharge standards. Water treatment granular carbon is a well-known and effective sewage deep treatment material.

Since most of the sewage treatment plants treat more than ten thousand tons, or even hundreds of thousands of tons of water every day, the big amount of water causes the amount of the water treatment granular carbon big as well. For example, as for a sewage treatment plant of fifty thousand tons, the amount of the water treatment granular carbon added once is up to one thousand tons. During the sewage deep treatment by using the water treatment granular carbon, the water treatment granular carbon is required to be replaced with new or regenerated water treatment granular carbon every a few months. In the case of a traditional activated carbon filter tank, if the quality of outlet water is below the prescribed standards for pollutants discharge, the water treatment granular carbon in the whole filter tank is required to be dug out for replacement, which not only leads to a big replacement amount, a time consuming process and a high labor intensity, but also causes the sewage treatment system to not be able to operate continuously and stably.

If a primary treatment cannot meet the prescribed standards for pollutants discharge when treating the sewage or the industrial sewage in the development area by using the water treatment granular carbon, it is still required to use the water treatment granular carbon for a secondary treatment.

In the case of the sewage deep treatment by using the water treatment granular carbon, if the quality of outlet water is below the prescribed standards for pollutants discharge, the water treatment granular carbon in the whole filter tank is required to be replaced, however, the water treatment granular carbon may not reach a saturated state. It not only increases the frequency of the replacement and regeneration of the water treatment granular carbon and the loss of the water treatment granular carbon, but also increases the cost of the water treatment.

SUMMARY

A purpose of the present disclosure is to provide a combined device for sewage deep treatment.

Another purpose of the present disclosure is to provide a sewage treatment method by using the above device.

In order to achieve the above purposes, the present disclosure provides a combined device for sewage deep treatment which is entirely formed as an open box supported on multiple pillars, wherein:

the box is partitioned into multiple water treatment units by first partition walls; the water treatment unit each consists of two parallel rows of grids, and each row of the grids are partitioned into multiple grids arranged in series by second partition walls; outlet tanks are arranged in the middle of the top of the two parallel rows of grids, and each of the outlet tanks is connected to an outlet header pipe;

the first partition wall has the same height as the box, and both the height of the upper edge of the outlet tanks and the height of the upper edge of the second partition walls between each row of grids arranged in series are smaller than the height of the box;

the outlet header pipe is connected to a primary outlet branch pipe through a primary two-way electric valve, and the other end of the primary outlet branch pipe is connected to a primary outlet main pipe; the outlet header pipe is connected to a secondary outlet branch pipe through a secondary two-way electric valve, and the other end of the secondary outlet branch pipe is connected to a secondary outlet main pipe; the primary outlet main pipe is connected to an intermediate tank;

the bottom of the box at each grid has a tapered configuration, each of which has an unloading door at its bottom, and an inlet coil pipe on which inlet holes are distributed is mounted within each of the tapered configuration; one end of the inlet coil pipe passes through the wall of the tapered configuration to be connected with an inlet header pipe, and the other end thereof passes through the wall of the tapered configuration to be connected with a drain valve;

the inlet header pipe is connected to a primary inlet branch pipe through a primary two-way electric valve, and the other end of the primary inlet branch pipe is connected to a primary inlet main pipe; the inlet header pipe is connected to a secondary inlet branch pipe through a secondary two-way electric valve, and the other end of the secondary inlet branch pipe is connected to a secondary inlet main pipe; and the primary inlet main pipe is connected to a collecting tank;

a water blocking tape is arranged in the middle of the first partition wall of the box;

rails, on which an electrically operated platform is arranged, are arranged at two sides of the top of the box;

the box is filled with water treating granular carbon;

both the primary two-way electric valve and the secondary two-way electric valve are connected to a control cabinet.

In the combined device for sewage deep treatment, the second partition walls are arranged between the two parallel rows of grids.

In the combined device for sewage deep treatment, both the upper edge of the outlet tanks and the upper edge of the second partition walls between each row of grids are at a distance from the upper edge of the box by 100 mm to 200 mm.

In the combined device for sewage deep treatment, a primary pump is arranged between the primary inlet main pipe and the collecting tank, and a secondary pump is arranged between the secondary main pipe and the intermediate tank.

In the combined device for sewage deep treatment, the box is formed of metal or reinforced concrete.

In the combined device for sewage deep treatment, the water treating granular carbon has a grain size of 0.5 mm to 8 mm, and the height of the filled water treating granular carbon does not go beyond the bottom of the outlet tank.

The present disclosure further provides a sewage treatment method by using the above combined device for sewage deep treatment, comprising steps of:

setting various water treatment units of the combined device for sewage deep treatment as the primary treatment unit or the secondary treatment unit respectively;

delivering the sewage in the collecting tank into the water treatment unit acting as the primary treatment unit through the primary inlet main pipe, the primary inlet branch pipe and the inlet header pipe by the primary pump, so as to perform a primary treatment;

allowing the treated sewage which doesn't meet the standard to flow into the intermediate tank through the outlet header pipe, the primary outlet branch pipe and the primary outlet main pipe.

The sewage treatment method further comprises steps of:

delivering the sewage in the intermediate tank into the water treatment unit acting as the secondary treatment unit through the secondary inlet main pipe, the secondary inlet branch pipe and the inlet header pipe by the secondary pump, so as to perform a secondary treatment;

discharging the treated sewage which meets the standard through the outlet header pipe, the secondary outlet branch pipe and the secondary outlet main pipe.

The combined device for sewage deep treatment according to the present disclosure consists of multiple water treatment units which are divided into primary treatment units and secondary treatment units. Depending on the water to be treated and the concentration of the pollutants in the sewage, various water treatment units can be adjusted flexibly in parallel, in series and in stages so as to perform a primary treatment, a secondary treatment or be ready for the replacement, by adjusting two stage pipes and valves.

(1) When the quality of the outlet water discharged from the secondary treatment units of the combined device for sewage deep treatment is close to the designed water quality index, the operation of various water treatment units may be adjusted.

(2) An inlet valve and an outlet valve in a water treatment unit having a high level of COD of the outlet water of the primary water treatment unit are closed and a drainage valve is opened to discharge the water in the water treatment unit. An unloading valve at the bottom of each taper of the water treatment unit is then opened to unload the water treatment granular carbon. Some new or regenerated water treatment granular carbon is added from the top of the water treatment unit for standby application. An operator may stand on the electrically operated platform to add the water treatment granular carbon and check the operation of the water treatment unit.

(3) A water treatment unit having a high level of COD of the outlet water of the secondary water treatment unit is converted into a primary water treatment unit by adjusting the inlet and outlet two-way electric valves.

(4) The standby water treatment unit which is replaced with new water treatment granular carbon is converted into a secondary water treatment unit by adjusting the inlet and outlet two-way electric valves.

(5) The above conversions are performed by operating the control cabinet by an operator in the case that the combined device for sewage deep treatment is in operation. During operating the combined device for sewage deep treatment, other water treatment units of the combined device for sewage deep treatment are operating as usual, thereby solving the problem which is difficult to operate continuously and stably during the replacement of activated carbon for the traditional activated carbon filter tank.

(6) The sewage treated by the biochemical system enters into the collecting tank and is delivered to the primary water treatment unit through the primary inlet main pipe of the combined device for sewage deep treatment by the primary pump. After being treated by the primary water treatment unit, the sewage flows into the intermediate tank through the primary outlet main pipe of the combined device for sewage deep treatment.

(7) The sewage in the intermediate tank is delivered to the secondary water treatment unit through the secondary inlet main pipe of the combined device for sewage deep treatment by the secondary pump. The sewage is treated by the secondary water treatment unit to reach the relevant standards for pollutants discharge, and then is discharged by the secondary outlet main pipe of the combined device for sewage deep treatment.

(8) During the operation of the combined device for sewage deep treatment, although the quality of the water treated by the primary water treatment unit is below the designed quality index of the outlet water, the designed quality index of the outlet water may be met after the secondary water treatment by using the water treatment granular carbon, thereby extending the usage time of the water treatment granular carbon in the primary water treatment unit, increasing the adsorption quantity of pollutants, increasing the service efficiency of the water treatment granular carbon, decreasing the number of replacement and regeneration for the water treatment granular carbon, and reducing the cost of the sewage deep treatment.

The combined device for sewage deep treatment according to the present disclosure has not been reported previously.

LIST OF REFERENCE NUMERALS

Figure 1:
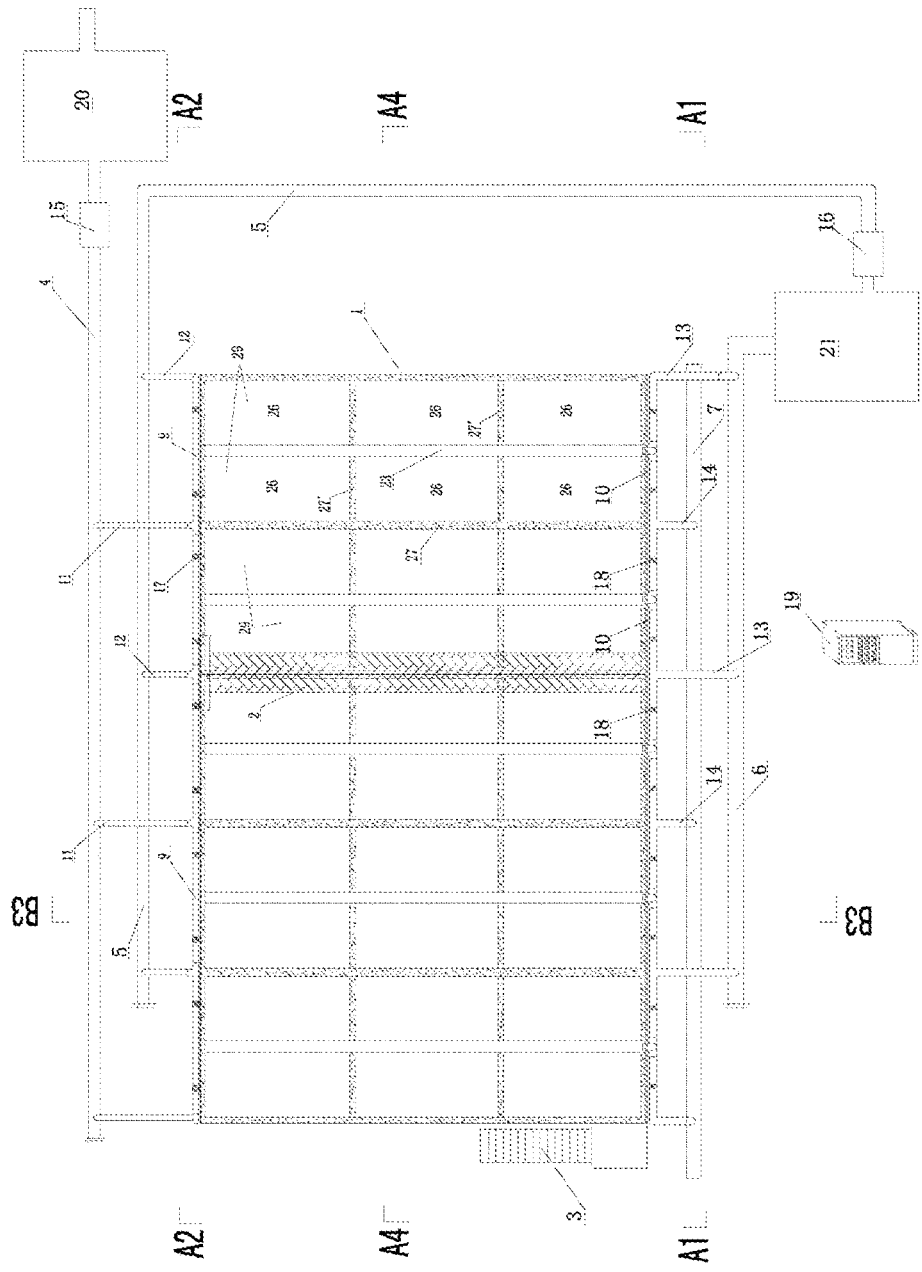
FIG. 1 is a structural plan schematic view of the combined device for sewage deep treatment according to the present disclosure.

1—box; 2—electrically operated platform; 3—ladder; 4—primary inlet main pipe; 5—secondary inlet main pipe; 6—primary outlet main pipe; 7—secondary outlet main pipe; 8—electronic flow meter; 9—inlet header pipe; 10—outlet header pipe; 11—primary inlet branch pipe; 12—secondary inlet branch pipe; 13—primary outlet branch pipe; 14—secondary outlet branch pipe; 15—primary pump; 16—secondary pump; 17—primary two-way electric valve; 18—secondary two-way electric valve; 19—control cabinet; 20—collecting tank; 21—intermediate tank; 22—unloading door; 23—outlet tank; 24—drainage valve; 25—inlet coil pipe; 26—grid; 27—partition wall; 28—pillar; 29—water treatment unit; 30—tapered configuration; 31—rail; 32—water treatment granular carbon; 33—water blocking tape.

DETAILED DESCRIPTION OF PREFERRED EMBODIMENTS OF THE DISCLOSURE

The combined device for sewage deep treatment according to the present disclosure consists of a box, an electrically operated platform, rails, a ladder, pillars, partition walls, an inlet coil pipe, an inlet header pipe, a primary inlet branch pipe, a secondary inlet branch pipe, a primary inlet main pipe, a secondary inlet main pipe, an outlet tank, an outlet header pipe, a primary outlet branch pipe, a secondary outlet branch pipe, a primary outlet main pipe, a secondary outlet main pipe, a control cabinet, a drainage valve, an electronic flow meter, a primary two-way electric valve and a secondary two-way electric valve.

In the combined device for sewage deep treatment, the box is partitioned into multiple water treatment units, each of which is partitioned into multiple grids by partition walls. The box has an open top, the bottom of the box is formed as a tapered configuration, below which an unloading door is located.

In the combined device for sewage deep treatment, a water blocking tape is arranged in the middle of the partition wall of the box.

In the combined device for sewage deep treatment, the box is supported by multiple pillars.

In the combined device for sewage deep treatment, rails are mounted at two sides of the top of the box, and an electrically operated platform is arranged on the rails.

In the combined device for sewage deep treatment, an outlet tank is arranged in the middle of the top of each water treatment unit and is connected to the outlet header pipe.

In the combined device for sewage deep treatment, an inlet coil pipe is mounted in the tapered configuration, inlet holes are distributed in the inlet coil pipe and have a diameter of 3 mm to 4 mm. One end of the inlet coil pipe passes through the wall of the tapered configuration to be connected to the inlet header pipe, and the other end thereof passes through the wall of the tapered configuration to be connected to the drainage valve.

In the combined device for sewage deep treatment, an electronic flow meter is mounted on the inlet header pipe.

In the combined device for sewage deep treatment, one end of the primary inlet branch pipe 11 is connected to the inlet header pipe 9 and the other end thereof is connected to the primary inlet main pipe 4.

In the combined device for sewage deep treatment, one end of the secondary inlet branch pipe 12 is connected to the inlet header pipe 9 and the other end thereof is connected to the secondary inlet main pipe 5.

In the combined device for sewage deep treatment, a primary two-way electric valve 17 is mounted on the pipe connecting the inlet header pipe 9 with the primary inlet branch pipe 11.

In the combined device for sewage deep treatment, a secondary two-way electric valve 18 is mounted on the pipe connecting the inlet header pipe 9 with the secondary inlet branch pipe 12.

In the combined device for sewage deep treatment, one end of the primary outlet branch pipe 13 is connected to the outlet header pipe 10 and the other end thereof is connected to the primary outlet main pipe 6.

In the combined device for sewage deep treatment, one end of the secondary outlet branch pipe 14 is connected to the outlet header pipe 10 and the other end thereof is connected to the secondary outlet main pipe 7.

In the combined device for sewage deep treatment, a primary two-way electric valve 17 is mounted on the pipe connecting the outlet header pipe 10 with the primary outlet branch pipe 13.

In the combined device for sewage deep treatment, a secondary two-way electric valve 18 is mounted on the pipe connecting the outlet header pipe 10 with the secondary outlet branch pipe 14.

In the combined device for sewage deep treatment, the box is filled with the water treatment granular carbon.

The present disclosure is further described in the following in combination with the accompanying drawings.

It should be noted that the directional terms such as left, right, up, down and so on mentioned in the specification is dependent on the directions shown in the accompanying drawings.

Figure 2:
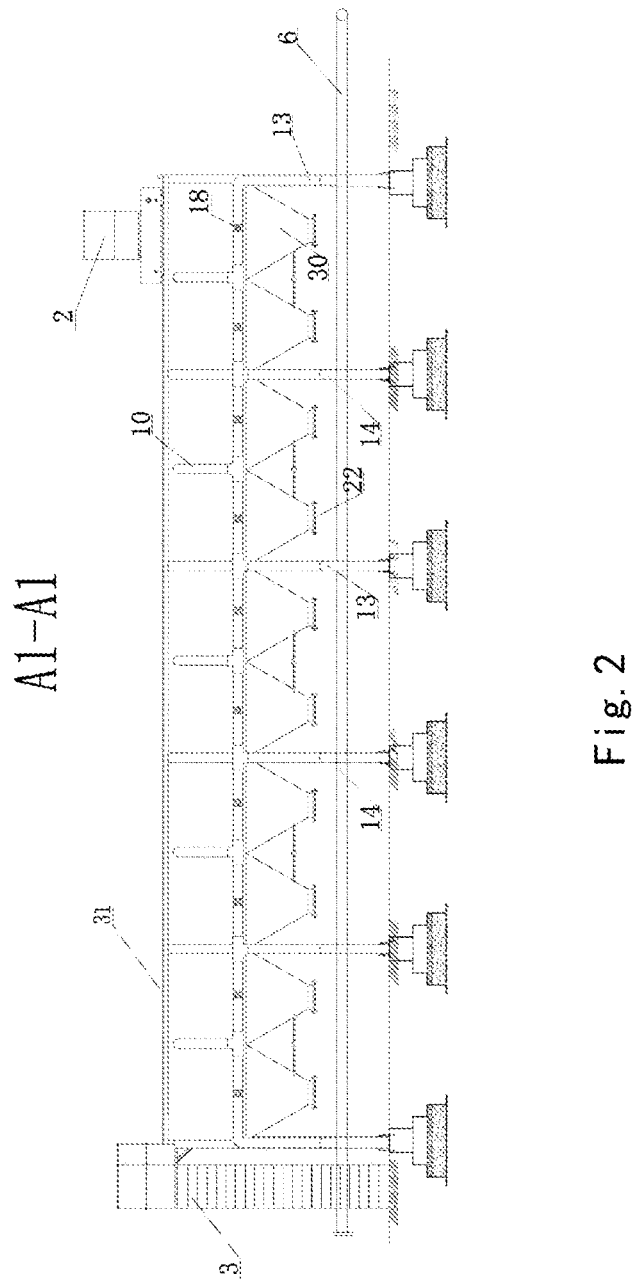
FIG. 2 is a side section view along the line A1-A1 in FIG. 1.
Figure 3:
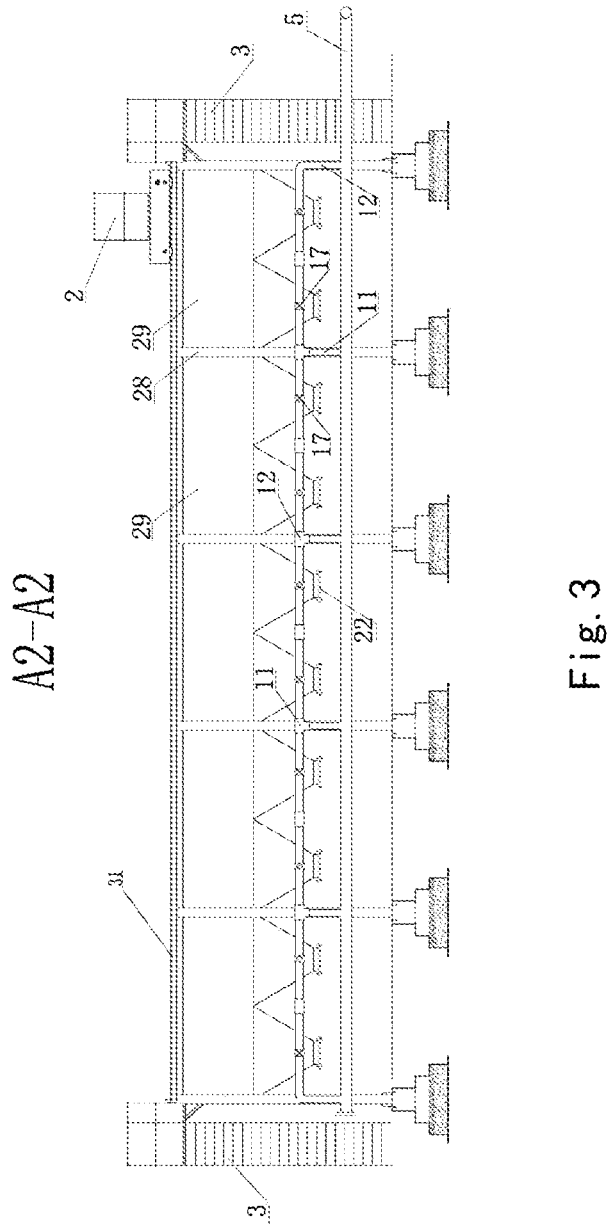
FIG. 3 is a side section view along the line A2-A2 in FIG. 1.
Figure 4:
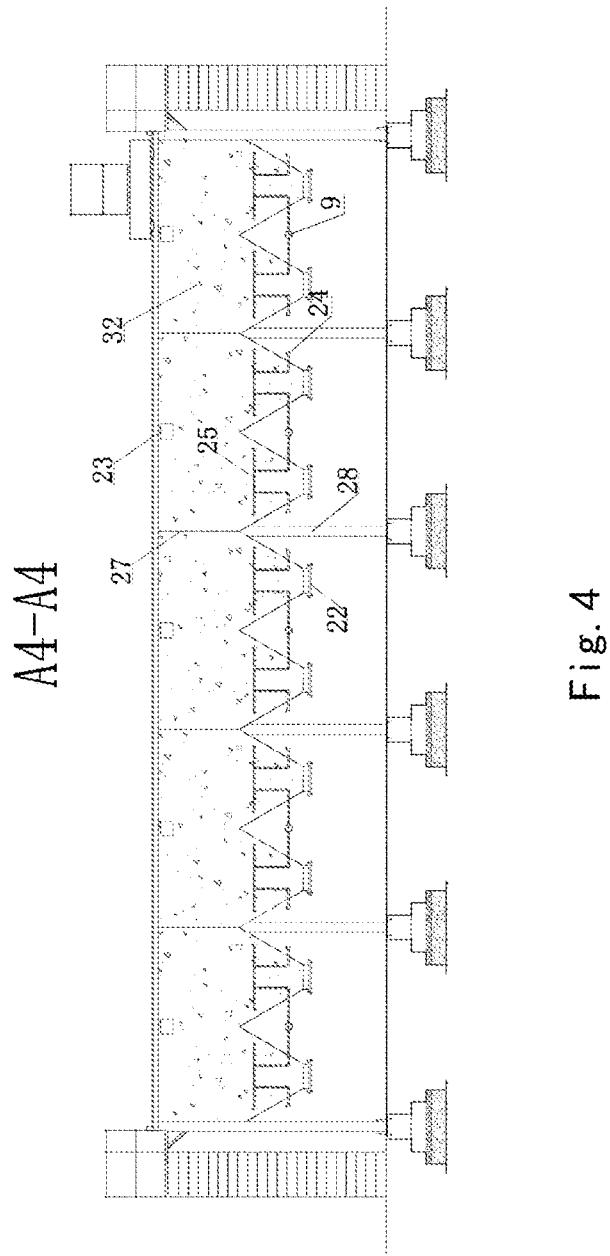
FIG. 4 is a side section view along the line A4-A4 in FIG. 1.
Figure 5:
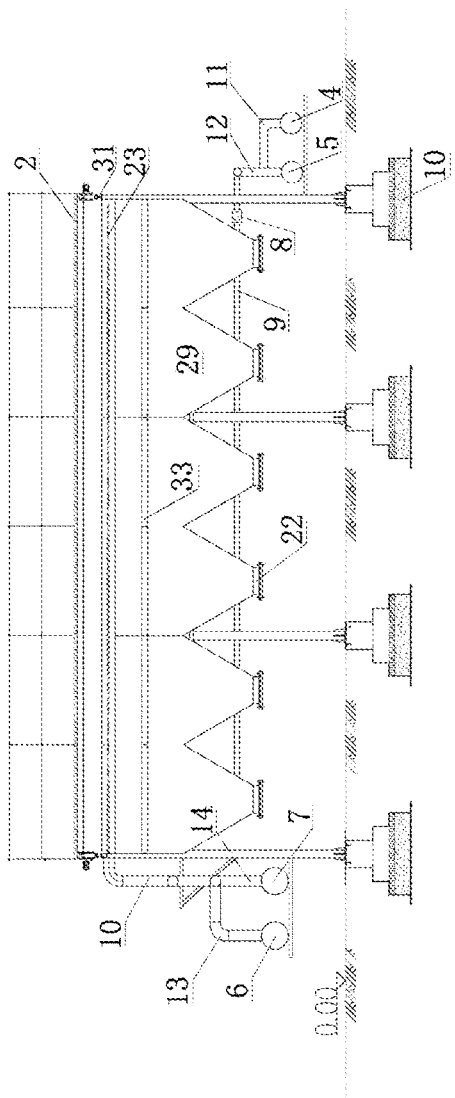
FIG. 5 is a side section view along the line B3-B3 in FIG. 1.

Referring to FIGS. 1 to 5, a box 1 of the combined device for sewage deep treatment according to the present disclosure has an open configuration at its top and is filled with the water treatment granular carbon 32. The box 1 is supported by multiple pillars 28. Rails 31 are mounted at two sides of the top of the box 1, and an electrically operated platform 2 is located on the rails 31. The box 1 is partitioned into multiple water treatment units 29 by partition walls 27, the water treatment unit 29 each consists of two parallel rows of grids 26, and each row of the grids 26 are partitioned into multiple grids 26 arranged in series by partition walls 27'. In an embodiment of the present disclosure, the partition walls 27' may be arranged between the two parallel rows of grids 26 (it is only shown in FIG. 1 that each row of the grids 26 are partitioned into multiple grids 26 arranged in series by partition walls 27', however, it may be interpreted and implemented to arrange the partition walls 27' between the two parallel rows of grids 26, which is not shown in FIG. 1). A water blocking tape 33 is arranged in the middle of the partition walls 27 of the box 1.

Each grid 26 of the box 1 has a tapered configuration 30 at its bottom, and an unloading door 22 is arranged below the tapered configuration 30. Outlet tanks 23, which are connected with an outlet header pipe 10, are arranged in the middle of the top of each row of grids 26. Further, partition walls 27' may also be arranged between the two parallel rows of grids 26 and have the same height as the outlet tanks in their upper edges.

The partition wall 27 has the same height as the box 1, and the height of the upper edges of the outlet tank 23 and the partition wall 27' between the grids is smaller than the height of the box 1. In an example, the outlet tank 23 has a width of 200 mm to 400 mm, a depth of 200 mm to 300 mm. The upper edge of the outlet tank 23 is distant from that of the box 1 by 100 mm to 200 mm.

An inlet coil pipe 25 is mounted in the taper configuration 30, and inlet holes which have a diameter of 2 mm to 4 mm are distributed on the inlet coil pipe 25, the row spacing and the spacing between the axes of the holes are 20 mm to 30 mm. One end of the inlet coil pipe 25 passes through the wall of the tapered configuration 30 and is connected to the inlet header pipe 9, the other end thereof passes through the wall of the tapered configuration 30 and is connected to the drainage valve 24. An electronic flow meter 8 is mounted on the inlet header pipe 9. One end of the primary inlet branch pipe 11 is connected with the inlet header pipe 9 and the other end thereof is connected to the primary inlet main pipe 4. One end of the secondary inlet branch pipe 12 is connected with the inlet header pipe 9 and the other end thereof is connected to the secondary inlet main pipe 5. A first two-way electric valve 17 is mounted on the pipe connecting the inlet header pipe 9 with the primary inlet branch pipe 11. A second two-way electric valve 18 is mounted on the pipe connecting the inlet header pipe 9 with the secondary inlet branch pipe 12. One end of the primary outlet branch pipe 13 is connected to an outlet header pipe 10 and the other end thereof is connected to a primary outlet main pipe 6. One end of the secondary branch pipe 14 is connected to the outlet header pipe 10 and the other end thereof is connected to the secondary outlet main pipe 7. A first two-way electric valve 17 is mounted on the pipe connecting the outlet header pipe 10 with the primary outlet branch pipe 13. A second two-way electric valve 18 is mounted on the pipe connecting the outlet header pipe 10 with the secondary outlet branch pipe 14.

The combined device for sewage deep treatment is formed of metal or reinforced concrete.

When the combined device for sewage deep treatment is used to treat the sewage, the water treatment granular carbon 32 having a grain size of 0.5 mm to 8 mm is added into the combined device for sewage deep treatment from the open top thereof. The height of the added water treatment granular carbon 32 will not go beyond the bottom of the outlet tank 23.

The number of the water treatment units 29 and the grids 26 of each water treatment unit 29 may be selected according to the amount and the water quality of the sewage to be treated, so as to meet the requirement of treated water amount. In the example shown in FIG. 1, there are five sets of water treatment units 29 which each comprises six grids 26.

The sewage treated by the biochemical system flows into the collecting tank 20 and is delivered to the primary water treatment unit 29 through the primary inlet main pipe 4, the primary inlet branch pipe 11 and the inlet header pipe 9 of the combined device for sewage deep treatment by the primary pump 15. After being treated by the primary water treatment unit 29, the sewage flows into the intermediate tank 21 through the outlet header pipe 10, the primary outlet branch pipe 14 and the primary outlet main pipe 6 of the combined device for sewage deep treatment. The sewage in the intermediate tank 21 is delivered to the secondary water treatment unit 29 through the secondary inlet main pipe 5, the secondary inlet branch pipe 12 and the inlet header pipe 9 of the combined device for sewage deep treatment by the secondary pump 16. The sewage is treated by the secondary water treatment unit 29 to reach the relevant standards for pollutants discharge, and then is discharged through the outlet header pipe 10, the secondary outlet branch pipe 14 and the secondary outlet main pipe 7 of the combined device for sewage deep treatment.

If the water quality discharged from the secondary outlet main pipe 7 of the combined device for sewage deep treatment is close to the upper limit of the designed water quality, the two-way electric valve 17 in the primary inlet branch pipe 11 and the two-way electric valve 18 in the primary outlet branch pipe 14 in a water treatment unit 29 having a high level of COD of outlet water will be closed, and the drainage valve 24 will be opened to discharge the water in the water treatment unit 29. Then, the unloading door 22 below each tapered configuration of the water treatment unit 29 will be opened by the operator to unload the water treatment granular carbon 32, and the water treatment unit 29 will be filled with new or regenerated water treatment granular carbon 32 from its top and then be converted into a standby state. The operator may stand on the electrically operated platform to add the water treatment granular carbon and check the operation of the water treatment unit. In the secondary water treatment units 29 of the combined device for sewage deep treatment, the two-way electric valve 17 in the secondary inlet branch pipe 12 and the two-way electric valve 18 in the secondary outlet branch pipe 13 in a water treatment unit 29 having a high level of COD of outlet water will be closed, while the two-way electric valve 17 in the primary inlet branch pipe 11 and the two-way electric valve 18 in the primary outlet branch pipe 14 in said water treatment unit 29 will be opened, then said water treatment unit 29 will be converted into the primary treatment from the secondary treatment.

The water treatment unit 29 which is replaced with new water treatment granular carbon 32 is converted into a secondary water treatment unit by adjusting the two-way electric valve 17 in the secondary inlet branch pipe 12 and the two-way electric valve 18 in the secondary outlet branch pipe 13. These conversions are performed by operating the control cabinet 19 by the operator in the case that the combined device for sewage deep treatment is in operation.

In the combined device for sewage deep treatment according to the present disclosure, when the water treatment granular carbon 32 in a water treatment unit 29 is being replaced, other water treatment units 29 of the combined device for sewage deep treatment are operating as usual, thereby solving the problem which is difficult to operate continuously and stably during the replacement of the water treatment granular carbon 32.

In the combined device for sewage deep treatment according to the present disclosure, if the outlet water treated by the primary water treatment unit 29 is below the designed quality index of the outlet water, the secondary water treatment unit 29 may be used to treat the outlet water so as to meet the designed quality index of the outlet water, thereby extending the usage time of the water treatment granular carbon 32 in the primary water treatment unit 29, increasing the adsorption quantity of pollutants for the water treatment granular carbon 32 in the primary water treatment unit 29, increasing the service efficiency of the water treatment granular carbon 32, decreasing the number of replacement and regeneration for the water treatment granular carbon 32, and reducing the cost of the sewage deep treatment.

EXAMPLE

A sewage treatment plant in a development area treats 9000 tons of water every day, the sewage, treated by the uniformity and gas floating pretreatment as well as the two-stage biochemical treatment, does not meet the discharge standards prescribed by the state, thus needs a deep treatment in order to make the quality of the outlet water meet the discharge standards. The deep treatment is performed by using the combined device for sewage deep treatment according to the present disclosure to perform a two-stage treatment.

The box 1 of the combined device for sewage deep treatment according to the present disclosure is partitioned into nine water treatment units 29 by partition walls 27, and each of the water treatment units 29 is partitioned into twelve grids 26 by the partition walls 27. The water blocking tape 33 is arranged in the middle of the partition wall 27 of the box 1. The box 1 has an open top and a bottom of tapered configuration 30. An unloading door 22 is arranged below the tapered configuration 30. The box 1 is supported by forty pillars 28. Rails 31 are mounted at two sides of the top of the box 1 and the electrically operated platform 2 is arranged on the rails 31. The box 1 is filled with the water treatment granular carbon 32.

The outlet tank 23 is arranged in the middle of the top of the box 1 and is connected to the outlet header pipe 10. The outlet tank 23 has a width of 200 mm, a depth of 300 mm. The upper edge of the outlet tank 23 is distant from that of the box 1 by 100 mm.

The inlet coil pipe 25 is mounted in the taper configuration 30 of the box 1, and inlet holes which have a diameter of 2 mm to 4 mm are distributed on the inlet coil pipe 25, the row spacing and the spacing between the axes of the holes are 20 mm. One end of the inlet coil pipe 25 passes through the wall of the tapered configuration 30 and is connected to the inlet header pipe 9, the other end thereof passes through the wall of the tapered configuration 30 and is connected to the drainage valve 24.

The electronic flow meter 8 is mounted on the inlet header pipe 9. One end of the primary inlet branch pipe 11 is connected to the inlet header pipe 9 and the other end thereof is connected to the primary inlet main pipe 4. One end of the secondary inlet branch pipe 12 is connected to the inlet header pipe 9 and the other end thereof is connected to the secondary inlet main pipe 5. A first two-way electric valve 17 is mounted on the pipe connecting the inlet header pipe 9 with the primary inlet branch pipe 11. A second two-way electric valve 18 is mounted on the pipe connecting the inlet header pipe 9 with the secondary inlet branch pipe 12.

One end of the primary outlet branch pipe 13 is connected to an outlet header pipe 10 and the other end thereof is connected to a primary outlet main pipe 6. One end of the secondary branch pipe 14 is connected to the outlet header pipe 10 and the other end thereof is connected to the secondary outlet main pipe 7. A first two-way electric valve 17 is mounted on the pipe connecting the outlet header pipe 10 with the primary outlet branch pipe 13. A second two-way electric valve 18 is mounted on the pipe connecting the outlet header pipe 10 with the secondary outlet branch pipe 14.

The combined device for sewage deep treatment is formed of steel reinforced concrete.

When the combined device for sewage deep treatment is used to treat the sewage, the water treatment granular carbon 32 having a grain size of 0.5 mm to 8 mm is added into the combined device for sewage deep treatment from the open top thereof. The height of the added water treatment granular carbon 32 will not go beyond the bottom of the outlet tank 23.

The sewage treated by the biochemical system flows into the collecting tank 20 and is delivered to the primary water treatment unit 29 through the primary inlet main pipe 4, the primary inlet branch pipe 11 and the inlet header pipe 9 of the combined device for sewage deep treatment by the primary pump 15. After being treated by the primary water treatment unit 29, the sewage flows into the intermediate tank 21 through the outlet header pipe 10, the primary outlet branch pipe 14 and the primary outlet main pipe 6 of the combined device for sewage deep treatment. The sewage in the intermediate tank 21 is delivered to the secondary water treatment unit 29 through the secondary inlet main pipe 5, the secondary inlet branch pipe 12 and the inlet header pipe 9 of the combined device for sewage deep treatment by the secondary pump 16. The sewage is treated by the secondary water treatment unit 29 to reach the relevant standards for pollutants discharge, and then is discharged through the outlet header pipe 10, the secondary outlet branch pipe 14 and the secondary outlet main pipe 7 of the combined device for sewage deep treatment.

If the water quality discharged from the secondary outlet main pipe 7 of the combined device for sewage deep treatment is close to the upper limit of the designed water quality (CODcr≤50 mg/L), in the primary water treatment units of the combined device for sewage deep treatment, by controlling the control cabinet 19, the two-way electric valve 17 in the primary inlet branch pipe 11 and the two-way electric valve 18 in the primary outlet branch pipe 14 in a water treatment unit 29 having a high level of COD of outlet water will be closed, and the drainage valve 24 will be opened to discharge the water in the water treatment unit 29. Then, the unloading door 22 below each tapered configuration of the water treatment unit 29 will be opened by the operator to unload the water treatment granular carbon 32, and the water treatment unit 29 will be filled with new or regenerated water treatment granular carbon 32 from its top and then be converted into a standby state.

In the secondary water treatment units 29 of the combined device for sewage deep treatment, the two-way electric valve 17 in the secondary inlet branch pipe 12 and the two-way electric valve 18 in the secondary outlet branch pipe 13 in a water treatment unit 29 having a high level of COD of outlet water will be closed, while the two-way electric valve 17 in the primary inlet branch pipe 11 and the two-way electric valve 18 in the primary outlet branch pipe 14 in said water treatment unit 29 will be opened, then said water treatment unit 29 will be converted into the primary treatment from the secondary treatment.

The water treatment unit 29 which is replaced with new water treatment granular carbon 32 is converted into a secondary water treatment unit by adjusting the two-way electric valve 17 in the secondary inlet branch pipe 12 and the two-way electric valve 18 in the secondary outlet branch pipe 13. These conversions are performed by operating the control cabinet 19 by the operator in the case that the combined device for sewage deep treatment is in operation.

In the combined device for sewage deep treatment according to the present disclosure, when the water treatment granular carbon 32 in a water treatment unit 29 is being replaced, other water treatment units 29 of the combined device for sewage deep treatment are operating as usual, thereby solving the problem which is difficult to operate continuously and stably during the replacement of the water treatment granular carbon 32.

In the combined device for sewage deep treatment according to the example of the present disclosure, if the outlet water treated by the primary water treatment unit 29 is below the designed quality index of the outlet water (CODcr>50 mg/L), the secondary water treatment unit 29 may be used to treat the outlet water so as to meet the designed quality index of the outlet water ((CODcr≤50 mg/L)), thereby extending the usage time of the water treatment granular carbon 32 in the primary water treatment unit 29, increasing the adsorption quantity of pollutants for the water treatment granular carbon 32 in the primary water treatment unit 29, increasing the service efficiency of the water treatment granular carbon 32, decreasing the number of replacement and regeneration for the water treatment granular carbon 32, and reducing the cost of the sewage deep treatment.

After the two-stage deep treatment by using the combined device for sewage deep treatment according to the present disclosure, the water quality of the sewage discharged by the sewage treatment plant meets the discharge standards prescribed by the state, the main water quality indexes before and after the deep treatment are listed in the following table.

| index | water treated by biological treatment | primary outlet water from the combined device | secondary outlet water from the combined device | discharge standards of pollutants from municipal sewage plant - first class A |
|---|---|---|---|---|
| CODcr (mg/l) | 109.12 | 65.3 | 21.24 | 50 |
| chromaticity (dilution ratio) | 64 | 8 | 4 | 30 |
| ammonia nitrogen (mg/l) | 11.1 | 4.975 | 4.763 | 5 |
| total phosphorus (mg/l) | 3.784 | 0.073 | 0.023 | 0.5 |

What is claimed is:

1. A combined device for sewage deep treatment which is entirely formed as an open box supported on multiple pillars, wherein:
    the box is partitioned into multiple water treatment units by first partition walls; the water treatment unit each consists of two parallel rows of grids, and each row of the grids are partitioned into multiple grids arranged in series by second partition walls; outlet tanks are arranged in the middle of the top of the two parallel rows of grids, and each of the outlet tanks is connected to an outlet header pipe;
    the first partition wall has the same height as the box, and both the height of the upper edge of the outlet tanks and the height of the upper edge of the second partition walls between each row of grids arranged in series are smaller than the height of the box;
    the outlet header pipe is connected to a primary outlet branch pipe through a primary two-way electric valve, and the other end of the primary outlet branch pipe is connected to a primary outlet main pipe; the outlet header pipe is connected to a secondary outlet branch pipe through a secondary two-way electric valve, and the other end of the secondary outlet branch pipe is connected to a secondary outlet main pipe; the primary outlet main pipe is connected to an intermediate tank;
    the bottom of the box at each grid has a tapered configuration, each of which has an unloading door at its bottom, and an inlet coil pipe on which inlet holes are distributed is mounted within each of the tapered configuration; one end of the inlet coil pipe passes through the wall of the tapered configuration to be connected with an inlet header pipe, and the other end thereof passes through the wall of the tapered configuration to be connected with a drain valve;
    the inlet header pipe is connected to a primary inlet branch pipe through a primary two-way electric valve, and the other end of the primary inlet branch pipe is connected to a primary inlet main pipe; the inlet header pipe is connected to a secondary inlet branch pipe through a secondary two-way electric valve, and the other end of the secondary inlet branch pipe is connected to a secondary inlet main pipe; and the primary inlet main pipe is connected to a collecting tank;
    a water blocking tape is arranged in the middle of the first partition wall of the box;
    rails, on which an electrically operated platform is arranged, are arranged at two sides of the top of the box;
    the box is filled with water treating granular carbon;
    both the primary two-way electric valve and the secondary two-way electric valve are connected to a control cabinet.

2. The combined device for sewage deep treatment according to claim 1, wherein, the second partition walls are arranged between the two parallel rows of grids.

3. The combined device for sewage deep treatment according to claim 1, wherein, both the upper edge of the outlet tanks and the upper edge of the second partition walls between each row of grids are at a distance from the upper edge of the box by 100 mm to 200 mm.

4. The combined device for sewage deep treatment according to claim 1, wherein, a primary pump is arranged between the primary inlet main pipe and the collecting tank, and a secondary pump is arranged between the secondary main pipe and the intermediate tank.

5. The combined device for sewage deep treatment according to claim 1, wherein, the box is formed of metal or reinforced concrete.

6. The combined device for sewage deep treatment according to claim 1, wherein, the water treating granular carbon has a grain size of 0.5 mm to 8 mm, and the height of the filled water treating granular carbon does not go beyond the bottom of the outlet tank.

7. A sewage treatment method by using the combined device for sewage deep treatment according to claim 1, comprising steps of:
    setting various water treatment units of the combined device for sewage deep treatment as the primary treatment unit or the secondary treatment unit respectively;
    delivering the sewage in the collecting tank into the water treatment unit acting as the primary treatment unit through the primary inlet main pipe, the primary inlet branch pipe and the inlet header pipe by the primary pump, so as to perform a primary treatment;
    allowing the treated sewage which does not meet the standard to flow into the intermediate tank through the outlet header pipe, the primary outlet branch pipe and the primary outlet main pipe.

8. The sewage treatment method according to claim 7, further comprising steps of:
    delivering the sewage in the intermediate tank into the water treatment unit acting as the secondary treatment unit through the secondary inlet main pipe, the secondary inlet branch pipe and the inlet header pipe by the secondary pump, so as to perform a secondary treatment;
    discharging the treated sewage which meets the standard through the outlet header pipe, the secondary outlet branch pipe and the secondary outlet main pipe.

* * * * *